(12) United States Patent
Kurapati et al.

(10) Patent No.: US 7,734,680 B1
(45) Date of Patent: Jun. 8, 2010

(54) METHOD AND APPARATUS FOR REALIZING PERSONALIZED INFORMATION FROM MULTIPLE INFORMATION SOURCES

(75) Inventors: Kaushal Kurapati, Ossining, NY (US); Jacquelyn Annette Martino, Cold Spring, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/408,794

(22) Filed: Sep. 30, 1999

(51) Int. Cl.
*G06F 15/16* (2006.01)

(52) U.S. Cl. .................. 709/203; 707/3; 707/104.1; 725/46; 725/53

(58) Field of Classification Search .............. 709/231, 709/200.7, 212, 213–217, 240, 223, 221, 709/249, 253, 201–203, 218, 104.1; 707/10, 707/7, 104.1, 3; 725/40, 48, 136, 39, 44–46, 725/49, 51, 53
See application file for complete search history.

(56) References Cited

U.S. PATENT DOCUMENTS

| | | | | |
|---|---|---|---|---|
| 5,857,181 | A | | 1/1999 | Augenbraun et al. ............ 707/2 |
| 5,861,881 | A | * | 1/1999 | Freeman et al. ........... 715/500.1 |
| 5,878,219 | A | | 3/1999 | Vance, Jr. et al. ....... 395/200.47 |
| 5,890,152 | A | | 3/1999 | Rapaport et al. ............... 707/6 |
| 6,029,195 | A | * | 2/2000 | Herz ........................... 707/10 |
| 6,044,403 | A | * | 3/2000 | Gerszberg et al. ............ 709/217 |
| 6,314,420 | B1 | * | 11/2001 | Lang et al. ..................... 707/3 |
| 6,356,905 | B1 | * | 3/2002 | Gershman et al. ............. 705/26 |
| 6,366,956 | B1 | * | 4/2002 | Krishnan ....................... 707/4 |

FOREIGN PATENT DOCUMENTS

| | | |
|---|---|---|
| EP | 0829811 A1 | 9/1997 |
| EP | 0849689 A2 | 12/1997 |
| WO | WO9710537 | 3/1997 |
| WO | WO9843183 | 3/1998 |
| WO | WO9849632 | 4/1998 |
| WO | WO9849637 | 4/1998 |

* cited by examiner

*Primary Examiner*—David Lazaro

(57) ABSTRACT

A system for a meta-browser includes a receiver, an output device for displaying a virtual unified browsing space, and a selector input device for navigating the space and making selections therein. The receiver is provided with the capability to receive information from multiple sources of different media types, including broadcast programming, additional information through the broadcast, electronic program guide information, and the Internet. The meta-browser presents personalized collections of information from multiple sources of different media types as different media collections in the unified browsing space, which can be easily and intuitively browsed. A user's browsing experience is further enhanced by personalized recommendations, which are generated based on a profile of the user's interests captured across multiple media sources. Collaborative filtering, which uses multiple user profiles to compute co-relations between the user's profile and others, is also used to make recommendations. The unified browsing space is also searchable.

18 Claims, 7 Drawing Sheets

| | |
|---|---|
| NNN NNNN NNNNN NNNN NNN | 14 |
| MMM MMMM MMMMM MMMM MMM | 13 |
| LLL LLLL LLLLL LLLL LLL | 12 |
| KKK KKKK KKKKK KKKK KKK | 11 |
| JJJ JJJJ JJJJJ JJJJ JJJ | 10 |
| III IIII IIIII IIII III | 9 |
| HHH HHHH HHHHH HHHH HHH | 8 |
| GGG GGGG GGGGG GGGG GGG | 7 |
| FFF FFFF FFFFF FFFF FFF | 6 |
| EEE EEEE EEEEE EEEE EEE | 5 |
| DDD DDDD DDDDD DDDD DDD | 4 |
| CCC CCCC CCCCC CCCC CCC | 3 |
| BBB BBBB BBBBB BBBB BBB | 2 |
| AAA AAAA AAAAA AAAA AAA | 1 |

METHOD AND APPARATUS FOR REALIZING PERSONALIZED INFORMATION FROM MULTIPLE INFORMATION SOURCES

BACKGROUND OF THE INVENTION

1. Field of the Invention

The present invention relates to browsing and/or searching various information sources, and more particularly to searching and/or presenting information from multiple information sources in a personalized and organized manner.

2. Description of Related Art

Web browsers and electronic program guides permit a user to browse various information sources such as Web sites, television program listings, and music collections. Typically, such searches are limited to one type of collection of information. For example, a user who is interested in information on a particular television program may browse the Web using a search engine, which will present the user with a listing of Web sites related to the particular television program. However, the results typically would not include the time when the particular television program is being shown in the user's viewing area. Television schedule information typically would have to be accessed separately using, for example, an electronic program guide.

Tools used for searching Web sites have been improved by including a capability of generating recommendations based on a profile of the user's interests, as have tools for viewing television and tools for listening to music. For example, a person may use a Web browser to access a search engine to obtain list of recommended Web sites based on the person's historical browsing activities, a person wishing to watch television may receive a list of recommended television programs to view based on the person's historical television viewing activities, and a person wishing to listen to music may receive a list of recommended music to listen to based on the person's historical listening activities Various proposals have been made to improve the usefulness of searching by providing an integrated approach to specifying and searching multiple information resources. While some of these proposals do generally advance the state of the art, further improvements are needed that use existing standards and a plethora of new component technologies to provide a search tool that gives the user greater access to a variety of different content types from a variety of different sources in a personalized, easy and intuitive way.

SUMMARY OF THE INVENTION

One embodiment of the present invention is a method of realizing personalized information for a user from multiple information sources, comprising establishing a user profile for the user bases on various interests of the user; establishing a virtual unified space; populating the virtual unified space with a plurality of different virtual media collections in accordance with the user profile; and browsing the unified space under user control.

Another embodiment of the present invention is a receiver apparatus for obtaining content from multiple information sources for viewing by a viewer. The receiver comprises an input/output ("I/O") controller including an Internet connection input, a video output, and a selector input; an adaptive user profile database; a filter coupled to the adaptive user profile database, the filter being coupled to the I/O controller for filtering information from the Internet connection input in accordance with the adaptive user profile database; means for displaying a virtual unified space through the video output; means for populating the virtual unified space with virtual multiple media collections using the filtered information from the implicit filter; and means for browsing the unified space in accordance with the selector input.

Another embodiment of the present invention is a computer program product. The computer program product comprises a computer readable medium having program logic recorded thereon for enabling a computer-enabled apparatus to display personalized information for a user from multiple information sources, comprising means for establishing a user profile for the user bases on various interests of the user; means for establishing a virtual unified space; means for populating the virtual unified space with a plurality of different virtual media collections in accordance with the user profile; and means for browsing the unified space under user control.

BRIEF DESCRIPTION OF THE DRAWINGS

FIG. 3 is a pictorial representations of one of the shelves of FIG. 2 as seen by a user while browsing, in accordance with the present invention.

DETAILED DESCRIPTION OF THE PREFERRED EMBODIMENT

A meta-browser presents personalized collections of information from multiple sources of different media types in a single browsing space. The presentation of collections of information from multiple sources of different media types in a single browsing space enhances a user's browsing experience by providing easy access to relevant information and the ability to search across multiple media types with a single search query. A user's browsing experience is further enhanced by personalized recommendations, which are generated based on a profile of the user's interests captured across multiple media sources. Collaborative filtering, which uses multiple user profiles to compute co-relations between the user's profile and others, is also used to make recommendations. As a result, the user has greater access to a variety of different content types in a personalized, easy and intuitive way.

Figure 1:
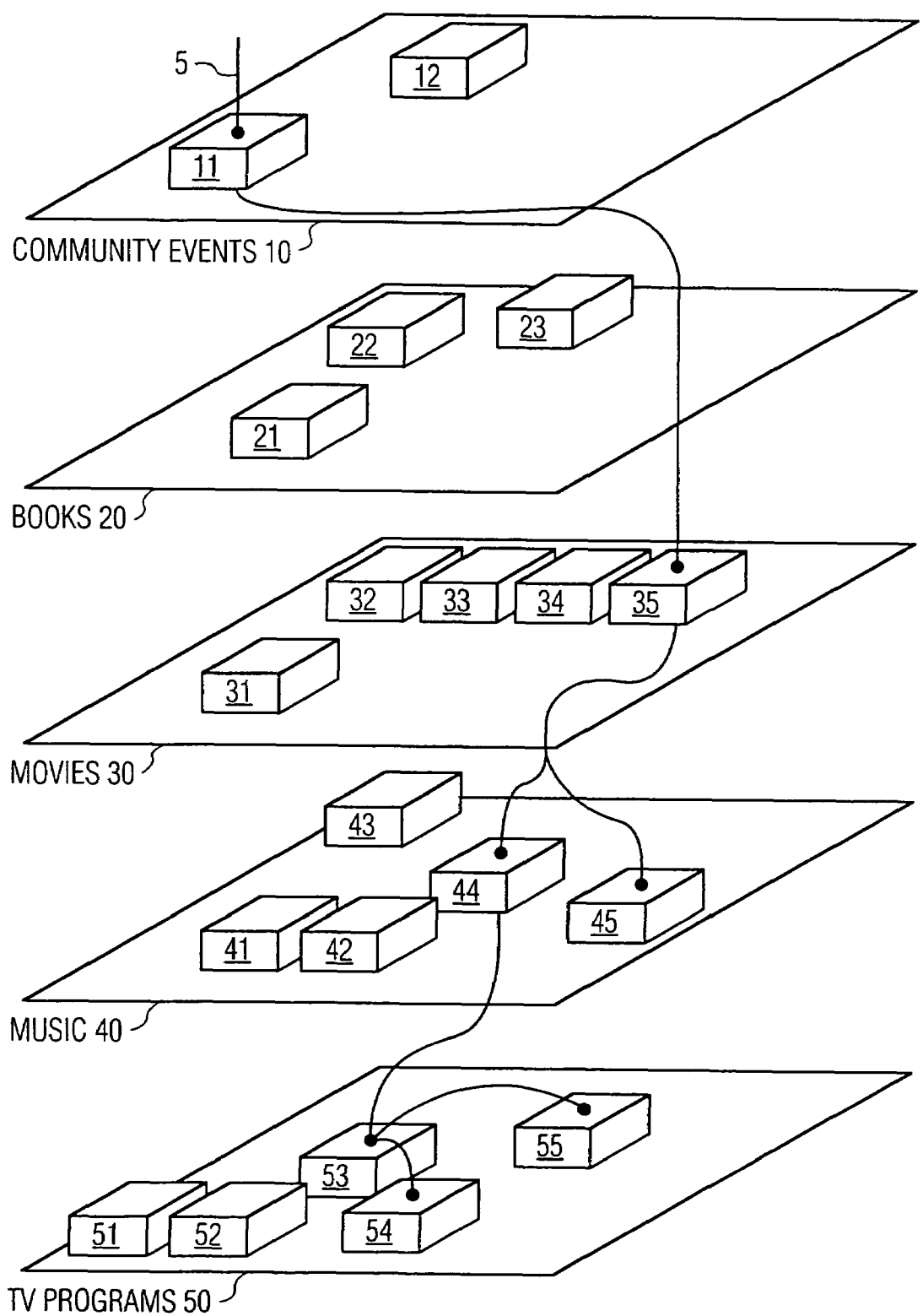
FIG. 1 is a pictorial representations of a virtual digital library, in accordance with the present invention.

The metaphor underlying the meta-browser is shown in FIG. 1. The metaphor is a virtual library that has multiple floors. For example, floor 10 contains community events, which includes, for example, two stack or shelve areas 11 and 12, each dedicated to a certain type of community event such as public hearings, public talks and debates, public celebrations and parades, non-profit organization meetings, volunteer community activities, and so forth. Floor 20 contains books, which includes, for example, three stack or shelve areas 21, 22 and 23, each dedicated to a certain category of books such as, for example, mystery, science fiction, classics, reference works, biographies, and so forth. Floor 30 contains movies, which includes, for example, five stack or shelve areas 31, 32, 33, 34 and 35, each dedicated to a certain genre of movie such as, for example, comedy, science fiction, action, drama, Westerns, and so forth. Floor 40 contains music, which includes, for example, five stack or shelve areas 41, 42, 43, 44 and 45, each dedicated to a certain genre of music such as, for example, jazz, rock, the Beatles, movie soundtracks, country, and so forth. Floor 50 contains television programs, which includes, for example, five stack or shelve areas 51, 52, 53, 54 and 55, each dedicated to a certain type of television programming such as, for example, sitcoms, TV magazines, news, sports, Westerns, and so forth. The type of floors in the virtual library, the types of stacks populating each floor, and the specific media items on each of the stacks preferably are selected based on the user's profile, although they may also be based on all of the information that is available to the meta-browser when the available information is a relatively small and manageable amount.

The unified browsing space may be the entire library, particular floors of the library, or one particular floor of the library, depending on what media collections the user wishes to browse. The user may, if desired, store the results of a search of the Internet and other information sources as a stack or stacks on a floor, and browse just those results as a unified browsing space.

Thread 5 shown in FIG. 1 represents a single search across many different media types and sources which the meta-browser performs automatically for a particular user based on the user's profile. For example, assume that a user frequently watches westerns movies and television programs but has shown no interest in books about western themes. These facts are included in the user's profile. When a new western movie becomes available, the meta-browser provides automatic notification to the user that the new western movie is available, as represented by stack 35 on the movie floor 30; that the musical score for the movie and other related music (e.g. country western) is available, as represented by stacks 44 and 45 on the music floor 40; that three different types of television programs (e.g. a TV magazine piece, a news report, and a TV serial) are available for viewing that are about the new Western movie or deal with related Western themes, as represented by stacks 53, 54 and 55 on the TV program floor 50; and that the cowboy star of the new movie will be making a public appearance in town at the annual rodeo, as represented by stack 11 on the community events floor 10. Observe that no books have been recommended.

While the meta-browser has not recommended any books, which is consistent with the user's current profile, the user is free to browse the stacks on book floor 20. One of the stacks, say stack 21, may be the stack for westerns, and the user may browse through stack 21 if he wishes to find a book about the subject of the new movie. Alternatively, if the user can identify keywords or other search terms representative of his interests, he may do an unconstrained search, i.e. a search not constrained by his profile, of all books on the entire book floor 20, or of just the western stack 23. If the user makes one or more book selections, the user's profile is updated accordingly and the meta-browser may recommend a book in subsequent searches.

Figure 2:
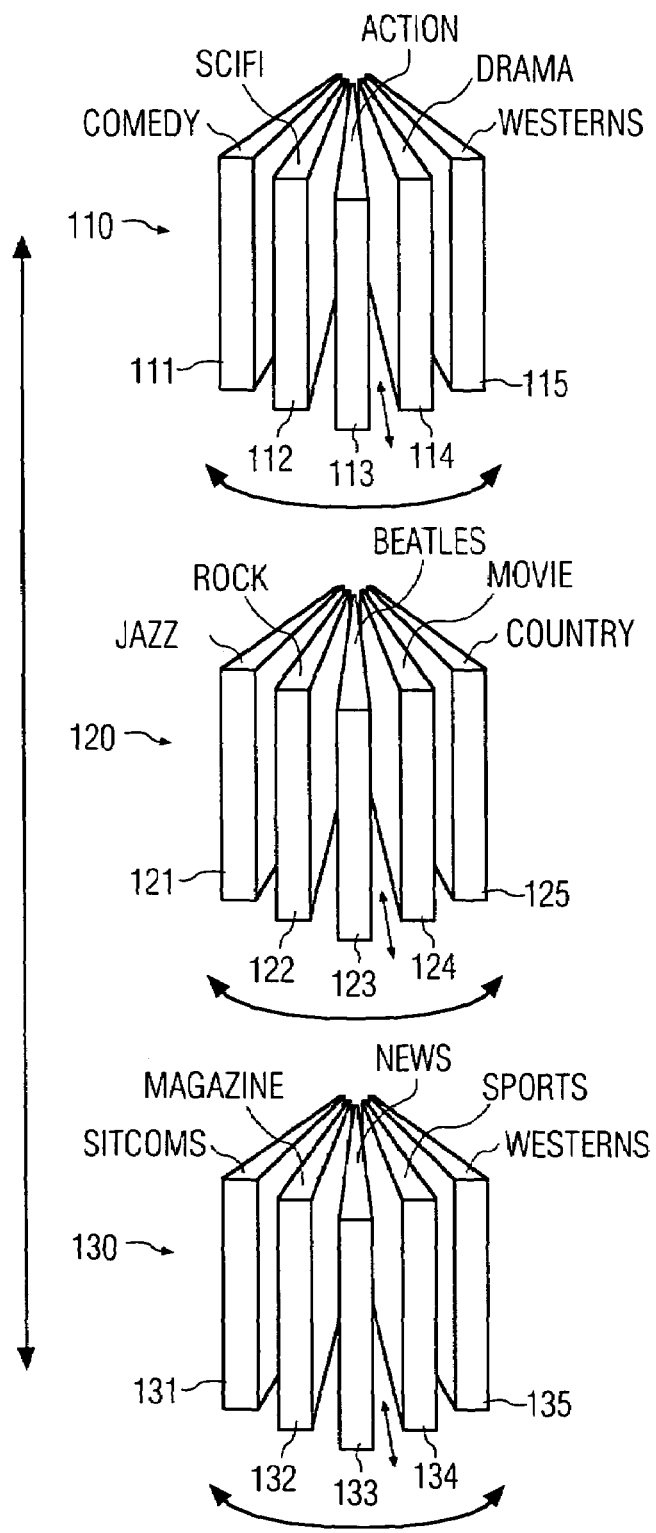
FIG. 2 is a pictorial representations of various shelves in the virtual digital library of FIG. 1 as seen by a user while browsing, in accordance with the present invention.

An illustrative example of a user's experience with the meta-browser is shown in FIGS. 2 and 3. FIG. 2 shows an illustrative screen view of a "library" having three particular floors, a movie floor 110, a music floor 120, and a television program floor 130. In this example, the library having floors 110, 120 and 130 is the unified browsing space. The movie floor 110 is represented by a number of stacks containing movies that might interest the user, as derived from the user's profile, illustratively a comedy stack 111, a science fiction stack 112, an action stack 113, a drama stack 114, and a Westerns stack 115. While five stacks are shown, the number of stacks may be greater or less, depending on the user's profile. The music floor 120 is represented by a number of stacks containing music that might interest the user, as derived from the user's profile, illustratively a jazz stack 121, a rock stack 122, a Beatles stack 123, a movie soundtrack stack 124, and a country stack 125. The television program floor 120 is represented by a number of stacks containing television programs that might interest the user, as derived from the user's profile, illustratively a situation comedy stack 131, a TV magazine stack 132, a news stack 133, a sports stack 134, and a Westerns stack 135. The user browses by moving between floors, between the stacks on a floor, and along shelves of a stack. For example, the user moves between floors by selecting the up-down arrows, between the stacks on a floor by selecting the left-right arrows, and along a particular stack by selecting the in-out arrows. Alternatively, the left-right arrows are used to "move" the stacks so that different stacks progressively move into the center position for so long as a left or right arrow is selected. The stack in the center position is browsed by selecting it with, for example, an OK button. If more information is available that can be shown on a screen, movement from floor to floor, from stack to stack, and along a particular stack brings previously portions into view while causing already seen portions to recede and disappear.

FIG. 3 is a view of a shelf in a particular stack which has been accessed by the user. The user may browse the shelf and select any of the items in any convenient manner, as with a mouse pointer or remote control touchscreen, or by selecting the item by number on a remote control touchscreen or hand held unit.

Once the item is selected, the user is presented with more information on the item. For example, if the item is a book, selecting the book displays all of the authors, the entire title (an abbreviated version may have been displayed in the previous shelf view due to space limitations), publisher, date of publication, and number of pages. A further selection of the same book displays an options list. An illustrative options list includes, for example, an e-commerce option that permits the user to price-compare and purchase the book using conventional Internet tools; an email or chat option, which permits to user to inform others about the book or about the user's thoughts regarding the book using conventional Internet tools; and a recommend option, which permits the user to learn about other information similar to or related to the book or its subject matter across various media types. These options are presented in any convenient way, including, for example, a menu or a nested set of interactive menus.

The user's profile influences not only the behavior of the individual options but also the particular options that are presented to the user. For example, the recommend option is heavily influenced by the user's profile. As a further example, the options list is likely to include a "compare price" option if the user tends to research prices before purchasing items and is not likely to include a "compare price" option if the user typically purchases each particular type of product from a particular vendor.

If the user wishes to search for an item of information rather than browse the stacks, the user may invoke a search engine at any level, including shelf (one or more shelves), stack (one or more selected stacks), floor (one or more selected floors), combinations of shelves, stacks, and floors, and the entire virtual library. An example of an entire library search is the search example represented by the thread 5 in FIG. 1, which if performed on the library in FIG. 2 might illustratively yield hits from stacks 115, 124, 125, 132, 133 and 135. The selection of the search engine is by any convenient manner, such as by placing a mouse pointer over an icon or be pressing a particular button on a remote control unit. Search terms are entered by using a keyboard, touchscreen, or virtual keyboard displayed on the viewing screen. Depending on the user preferences, the results produced by the search engine may or may not be filtered in accordance with the user's profile. The results may be viewed in any convenient manner, as by moving along the thread 5, or creating a separate floor containing media collections resulting from the search, or conventionally as a list.

While the library metaphor is a particularly useful personalized visualization of heterogeneous media, other useful visualizations are possible. Other possible visualizations include, for example, simple nested menus and an office and file drawer metaphor.

Figure 4:
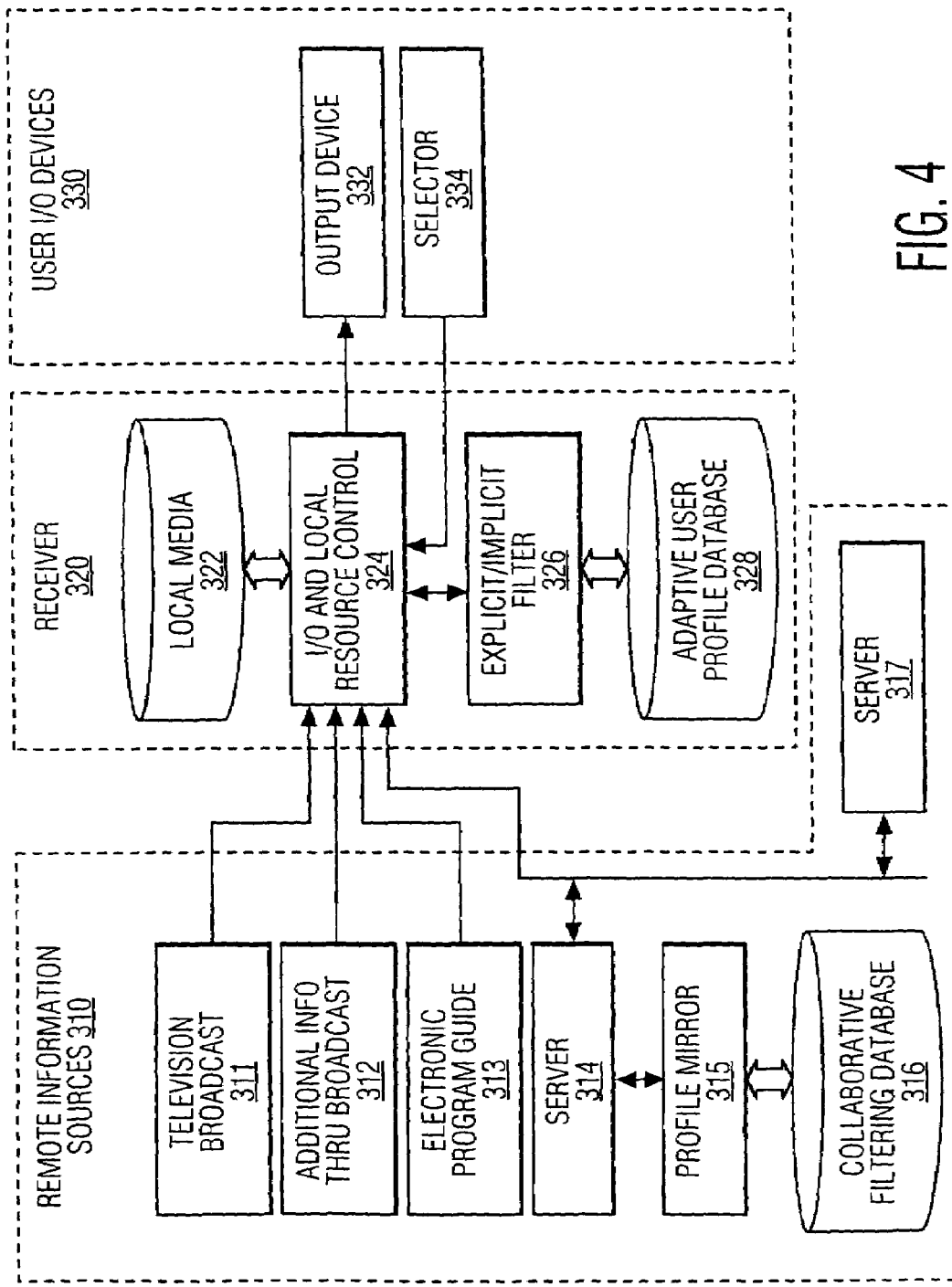
FIG. 4 is a block schematic diagram of a meta-browser system in accordance with the present invention.

An illustrative system which includes various computers, input and output devices, local area and global networks, enabling software, and databases, is shown in FIG. 4. The meta-browser runs on the user's portion of the system, which includes receiver 320 and user I/O devices 330. The receiver 320 and its output device 332 may be implement in any of a variety of ways, including a set top box for use with a standard or high definition television monitor or receiver, a digital "smart" television, an application running on a personal computer or on a "smart" appliance having an attached monitor, or even as a personal smart television receiver or personal data assistant ("PDA") type device having a small screen or viewing glasses, headphones, and a wireless or wired Internet connection. Set top boxes are presently available from a variety of vendors, including, for example, General Instruments, Inc. of Horsham, Pa., and Scientific Atlanta, Inc. of Atlanta, Ga., and even more powerful set top boxes are in development and production. The set top box may be a Java console, for example. As various choices are presented to the user on the output device 332, the user makes a selection using selector 334. The selector 334 is any suitable device, such as, for example, a keyboard and mouse, a mouse style or joystick style handheld device (if the receiver 320 supports a mouse pointer), a remote control touchscreen, or function or select buttons on a remote control handheld unit.

The set top box or other types of receivers 320 operate preferably under software control to provide I/O and local resource control 324. Preferably, the receiver 320 is provided with the capability to access local media 322, which includes one or more of various commonly available media such as, for example, DVDs, CDs, CD-ROMs, flash memory, analog video and audio tapes, and digital video and audio tapes, as well as digital media files contained on storage media such as an internal hard disk and accessed from various local computers over a local area network. Preferably, receiver 320 is provided with the capability to receive broadcast programming such as television broadcast 311 and additional information through the broadcast 312. The additional information 312 is coordinated with the television broadcast 311 and preferably originates with it, is often context sensitive by design, and illustratively accompanies the television broadcast 311 in the vertical blanking interval (for analog television). The television broadcast 311 and the additional information 312 is available is available by a variety of communications techniques, including radio, cable, satellite, and phone line. Preferably, receiver 320 is provided with the capability to receive an electronic program guide ("EPG") 313, which may be provided in a separate broadcast channel, as a separate data stream in a digital television signal, or as additional information through the broadcast in the vertical blanking interval of an analog television signal, or is accessible from an Internet site. Preferably, receiver 320 is provided with the capability to access the Internet, which includes a vast variety of resources as represented by servers 314 and 317. Internet access is available is available by a variety of communications techniques, including radio, cable, satellite, and phone line.

The explicit/implicit filter 326 provides filtering for information from various sources, so that preferably only context-sensitive information that is within the scope of the user's profile is furnished to the output device 332. The explicit/implicit filter 326 also prioritizes the filtered information, if desired, in accordance with the user's profile. The performance of the explicit/implicit filter 326 is dependent on the user's personal profile, as defined by information contained in the adaptive user profile database 328, and on the user's selections as made by the user using selector 334. Moreover, the adaptive user profile database 328 itself is updated in accordance with the user's selections.

The explicit/implicit filter 326 acts on remote information sources 310 in various ways. For example, a user watching a television broadcast 311 may elect to use none of the additional information 312, all of the additional information 312, or only those aspects of additional information 312 that interests the user. In the later case, the explicit/implicit filter 326 acts on the additional information 312 by suppressing the use of information by the receiver 320 that is not within the scope of the user's personal profile and permitting the use of information by the receiver 320 that is within the scope of the user's personal profile.

The explicit/implicit filter 326 also processes information from the electronic program guide 313 to enhance its usefulness to the user. Enhancements include notifying the user based on the user's profile when a program that the user is likely to enjoy is about to be broadcasted, eliminating entire channels and particular programs that the user is unlikely to want to watch, highlighting programs that the user may be particularly interested in watching, and so forth.

The explicit/implicit filter 326 also act on requests (URL, CGI, and so forth) to and/or information received from the servers 314 and 317 on the World Wide Web, as well as on requests to and/or information received from local resources and locally networked resources. Information from Web resident servers may be requested using an Internet browser or may be pushed by the server to an Internet browser, as is well known. The explicit/implicit filter 326 operates on requests to and/or information received from Web resident servers in various ways, such as by: filtering the requests to limit them in accordance with the user's personal profile; augmenting the requests with additional requests in accordance with the user's personal profile, as when the explicit/implicit filter 326 "recommends" information that is available from information sources on the Internet; filtering the information received from sources on the Internet to limit them in accordance with the user's personal profile; and prioritizing filtered information.

Through implicit filtering, the adaptive user profile database 328 captures the personality of a particular user (or several users, if more than one user uses the receiver 320), and is progressively refined and augmented to create an adaptive profile based on the user's history together with marketing statistics. The personal profile develops over time, in that the system "learns" what type of information to offer to the user based on various criteria such as what the user usually selects and the amount of time that the selection holds the user's interest, if relevant, and adapts accordingly. For example, if advertising information rather than reference material is usually selected, the adaptive user profile database 328 reflects the user's behavior in a ratio and uses the ratio in responding to the user's current programming choice or specific requests.

Explicit filtering involves building or supplementing a user's profile based on her answers to specific questions. For example, detecting a new user, the explicit/implicit filter 326 presents a pre-programmed list of questions to the user to establish an initial profile, thereby allowing the filter 326 to function on at least a rudimentary level initially. Explicit filtering is also useful for confirming trends identified by the explicit/implicit filter 326, thereby saving time in updating the user's profile, and for resolving any ambiguity that may be detected in a user's developed profile by posing questions to the user to resolve the ambiguity. Implicit filtering involves building a user's profile based on the users interactions with the receiver 320, including television program selections, additional information selections, selections from the electronic program guide, Web links accessed, Web sites explored, purchases made, and so forth. The personal profile of each user using the meta-browser is stored in the adaptive user profile database 328, which preferably resides on the receiver 320 along with the explicit/implicit filter 326 and is locally accessible to the explicit/implicit filter 326.

Implicit filtering may, if desired, draw from collaborative data in building a user's profile. For example, FIG. 4 shows that the explicit/implicit filter 326 has access to a profile mirror 315, which is associated with a collaborative filtering database 316 and the server 314. The profile mirror 315 may be another computer or another process running on the same computer as the server 314. It is not part of the collaborative filtering database 316, but rather includes profile information derived from the collaborative filtering database 26 and, if desired, from the adaptive user profile database 328. The collaborative filtering database 316 is a sizeable database of profiles of users who visit the Web sites hosted by the server 314. A number of these users are likely to have profiles that are similar to the profile of the user whose profile is maintained in the adaptive user profile database 328. These similar profiles are identified by comparing the user's profile with the collaborative filtering database 316. Differences between the user's profile in the adaptive user profile database 328 and the similar profiles in the collaborative filtering database 316 represent possible user interests, and as such are useful to the user in a variety of ways.

One way in which the differences between the user's profile and the similar profiles in the collaborative filtering database 316 is useful is in response to a user's selection made with the selector 334 to receive personalized information on a "push" bases. In this case, the server 314 illustratively has "push" capabilities. The differences are furnished by the profile mirror 315 to the server 314 which thereby pushes only potentially meaningful information to the user. If the user acts on the pushed information, the adaptive user profile database 328 is updated accordingly.

Another way in which the differences between the user's profile and the similar profiles in the collaborative filtering database 316 is useful is to create recommendations for the user under the assumption that the user might be interested in the same things as other users who have similar profiles. In this case, the differences are furnished by the profile mirror 315 to the receiver 320, which presents them as suggestions to the user. If the user acts on any of the suggestions, the adaptive user profile database 328 is updated accordingly.

Another way in which the differences between the user's profile and the similar profiles in the collaborative filtering database 328 is useful is to augment the profile of the user whose profile is maintained in the adaptive user profile database 328, under the assumption that the user will be interested in the same things as other users who have similar profiles. The augmentation is performed in any convenient manner. For example, one technique involves copying the adaptive user profile database 328 to the profile mirror 315, updating the profile mirror with appropriate information from the collaborative filtering database 316, and writing the updated user profile back to the adaptive user profile database 328. Another technique involves copying the adaptive user profile database 328 to the profile mirror 315 so that the differences may be identified, then furnishing the differences to the explicit/implicit filter 326 which handles updating the adaptive user profile database 328. The new data in the user's profile is evaluated over time by the explicit/implicit filter 326 just as is other data in the user's profile.

The collaborative filtering database 316 is also useful for establishing a "starter kit", or an initial profile of data for a new user. Preferably, the new user is asked a number of explicit start up questions as part of the explicit filtering process by the explicit/implicit filter 326, and then the adaptive user profile database is augmented from the collaborative filtering database 316.

Suitable algorithms and software for performing data collection and filtering and for maintaining databases such as the adaptive user profile database 328 and the collaborative filtering database 316 is well known to persons of ordinary skill in the art. Generally known as software agents, suitable software is based on any of a variety of techniques, including Bayesian probability-based recommendation models, decision tree models, neural network models, and distance metrics. The database itself may be organized in any suitable way, including flat file, relational, and object oriented. Examples of a Bayesian probability-based recommendation model are described in, for example, the following articles, which hereby are incorporated herein in their entirety by reference: Pazzani, M., Muramatsu, J., and Billsus, D., Syskill & Webert: Identifying Interesting Web Sites, in Proceedings of the National Conference on Artificial Intelligence, Portland, Oreg., 1996; Billsus, D. and Pazzani, M., Learning Probabilistic User Models, in Workshop Notes of Machine Learning for User Modeling, Sixth International Conference on User Modeling, Chia Laguna, Sardinia, 1997; and Pazzani, M. and Billsus, D., Learning and Revising User Profiles: The Identification of Interesting Web Sites, in Machine Learning 27, 1997, pp. 313-331. An example of collaborative filtering is the technology being researched at the Media Laboratory of the Massachusetts Institute of Technology, Cambridge, Mass. and commercialized by such companies as Firefly Networks, Inc. of Cambridge, Mass.

Figure 5A:
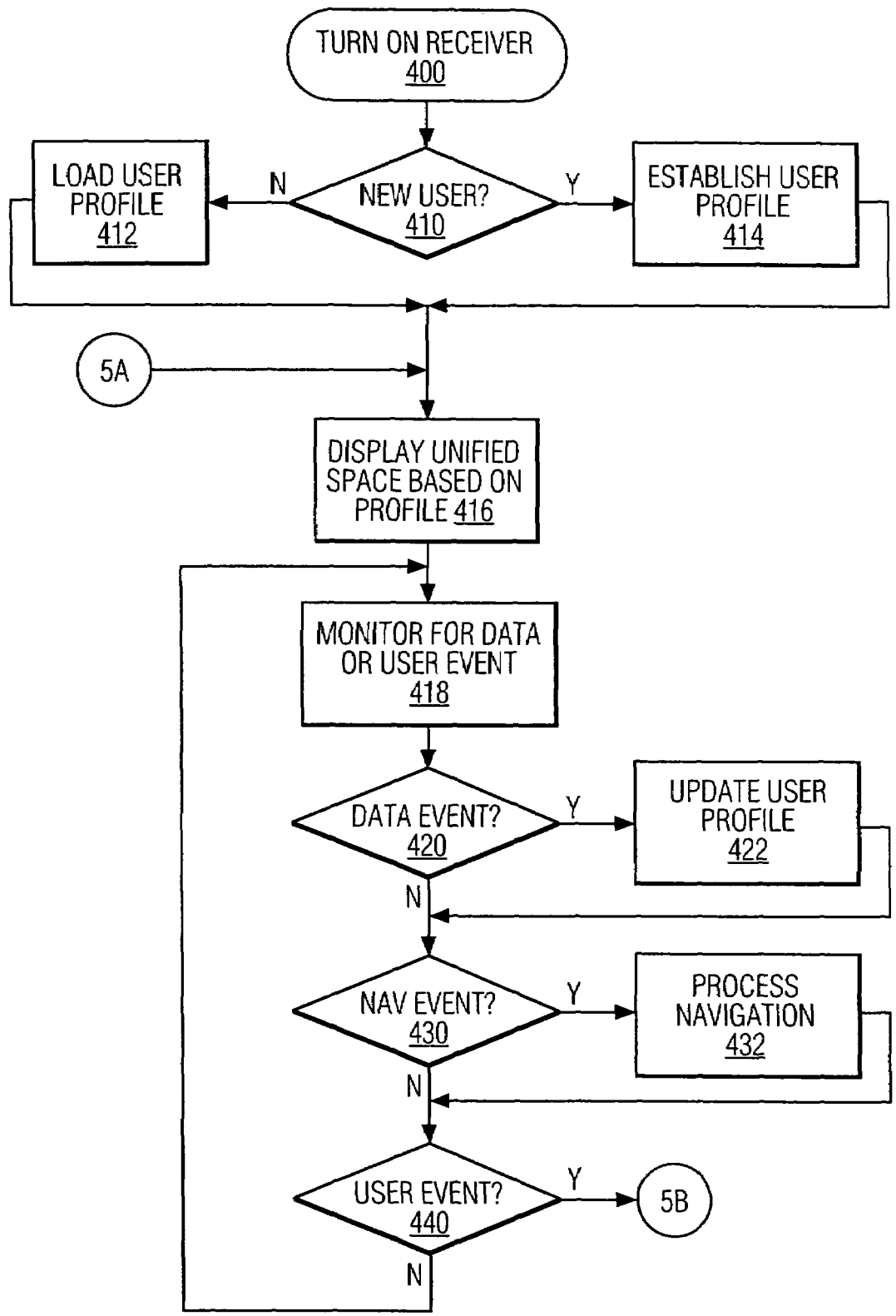
FIGS. 5A, 5B and 5C are segments of a flowchart of an illustrative operating session of the meta-browser of FIG. 4, in accordance with the present invention.
Figure 5B:
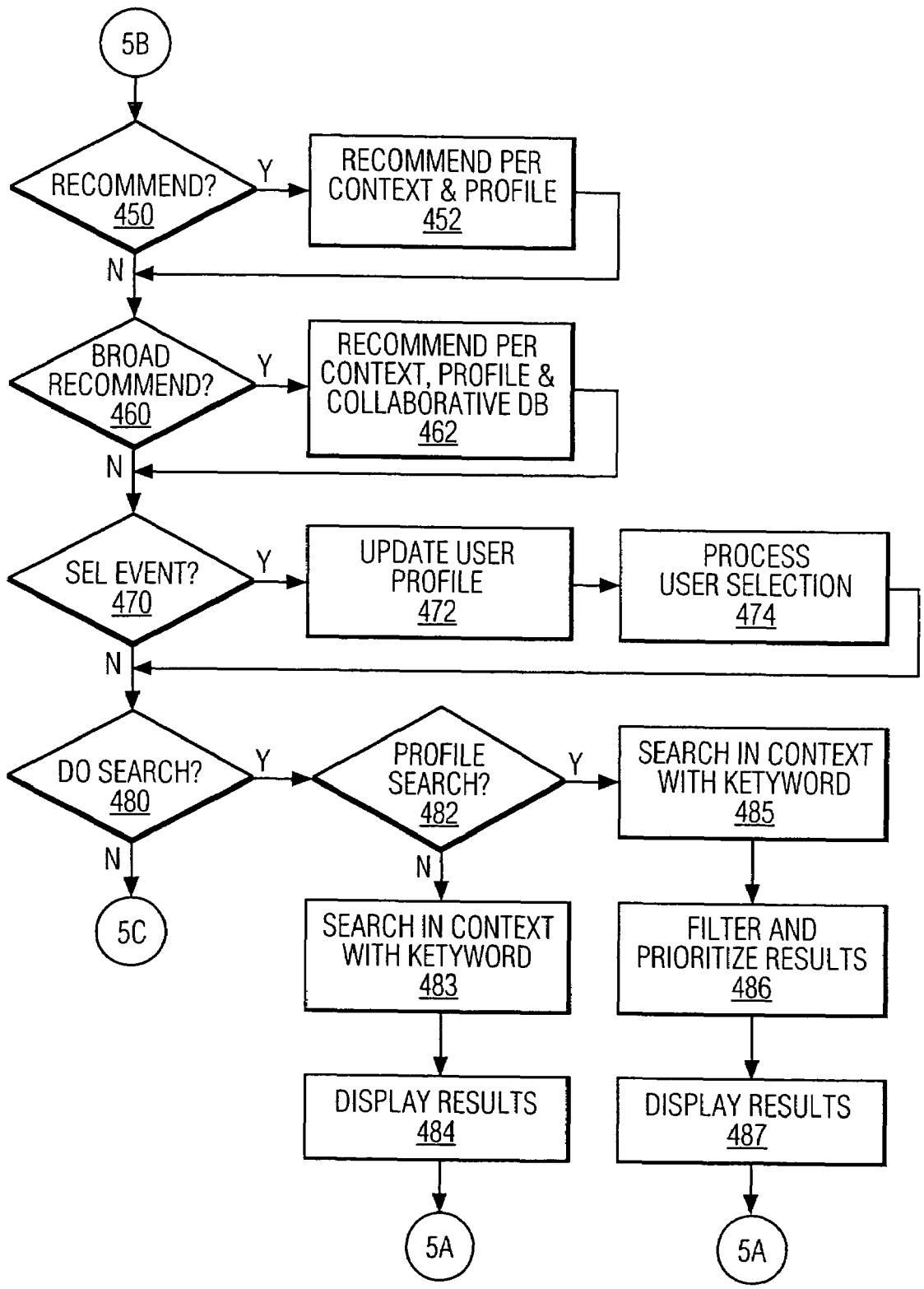
Figure 5C:
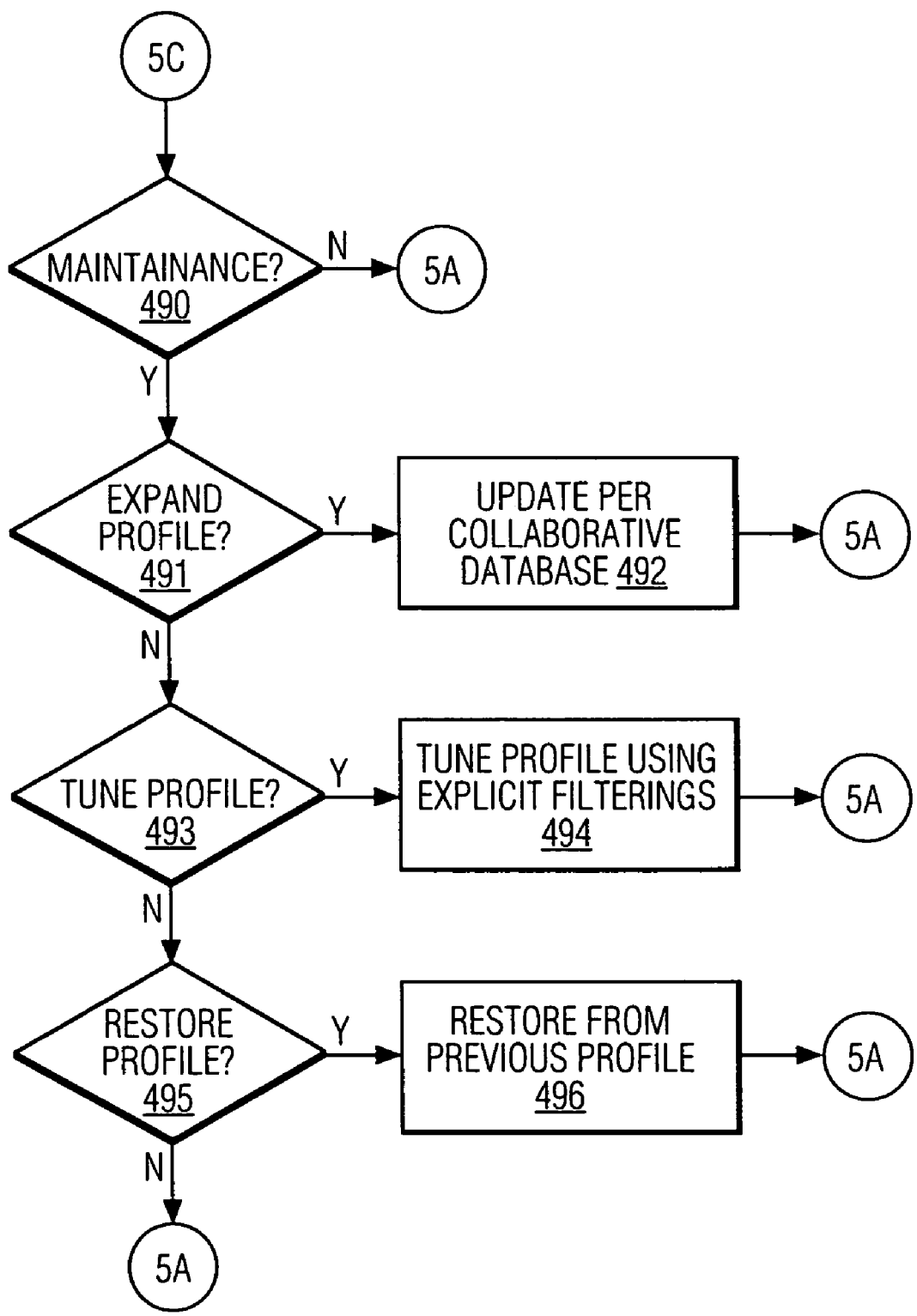

FIG. 5 is a flowchart showing an operating session of the meta-browser application software running on the receiver 320. FIG. 5 is merely illustrative, since the meta-browser may be programmed in a variety of ways depending on the experiences, skill and preferences of the system architect and computer programmers. When the receiver 320 is switched to active mode (step 400), the meta-browser application determines in any suitable way, as by user ID and password whether the current user is a new user (step 410). If the current user is a new user, a user profile is established (step 414) in any suitable manner, as by explicit filtering with or without supplementation by collaborative filtering. If the current user is an former user, his or her profile is loaded.

A unified browsing space then is displayed based on the user profile (step 416), the unified space being, with reference to the previously described library metaphor, the graphical display of an entire library, selected floors of the library, or a particular floor. The unified browsing space is populated with information arranged in a number of different media collections. The information is acquired in any suitable way. One example is for the meta-browser application to remain active even while the receiver is on standby, gathering and updating information in accordance with the user's profile. In this way, whenever the user begins to use the meta-browser, the library already contains updated information in the form of content, links and recommendations.

The meta-browser preferably monitors for "data events" even if the user engages in other activities such as watching television or listening to music, and provides the user the ability to browse the unified space through navigation events and to take actions through user events (step 418). A data event includes the receipt by the receiver 320 of information or programming that is relevant to determining the interests of the user. An example of a data event is a new television program running for a significant time from its beginning, even if no channel was changed to receive the new program. Another example of a data event is the playing of a new musical selection from a Web "push" site such as spinner.com, for example. When a data event is detected (step 420), the user profile is updated accordingly (step 422).

A navigation event occurs when the user selects an arrow to move between floors, to move to a particular stack on a floor, and to move along a stack. When a navigation event is detected (step 430), the navigation command is processed (step 432) so that the user moves as directed in the virtual library.

A user event includes any action taken by the user with the selector 334. Examples of user events are a request for recommendations, request for an expanded recommendation based on collaborative filtering, selection of a screen object to obtain more information about the object or to perform a function indicated by the object, selection of a listed option to perform a particular function, and a context-based search.

If the user makes a request for recommendations (step 450), the meta-browser makes recommendations based on the context in which the request is made and the current user profile (step 452). With respect to FIG. 2, for example, a user watching a Western on television receives recommendations about, for example, other television Westerns from stack 135, TV magazine features on Westerns from stack 132, news reports on events related to Westerns from stack 133, movie soundtracks of Western films from stack 124, country western music from stack 125, and Western movies from stack 115. A similar result is realized if the user is browsing a shelf of Western television shows in stack 135 and presses the recommendation button.

If the user makes a request for an expanded recommendation based on collaborative filtering (step 460), the meta-browser makes recommendations based on the context in which the request is made, the current user profile, and through collaborative filtering the profiles of others having interests generally similar to the interests of the user (step 462).

If the user selects a screen object to obtain more information about the object or to perform a function indicated by the object or selects a listed option to perform a particular function (step 470), the user's profile is updated to reflect the selection (step 472) and the selection is processed (474).

The user may elect to perform a search directly from the screen depiction of the unified space (step 480), or from a screen object or an options list (step 470). A search directly from the screen depiction of the unified space is based on the context display on the screen and the keyword or other search term or example used. Such a search may be otherwise unconstrained by the user's profile (steps 482, 483 and 484), or the search results may be filtered and prioritized in accordance with the user's profile (steps 482, 485, 486 and 487), as desired by the user.

The various methods and apparatus described herein enhances a user's browsing experience by providing easy access to relevant information, an in particular to a variety of different media content from a variety of different sources in a personalized, easy and intuitive way.

The description and applications as set forth herein are illustrative and are not intended to limit the scope of the invention, which is defined in the following claims.

Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention, as set forth in the following claims.

What is claimed is:

1. A method operable in a computer-enabled apparatus, said method comprising:

establishing a user profile for a user based on various interests of the user;

establishing a virtual unified space including a virtual library on the computer-enabled apparatus;

populating the virtual library with a plurality of different virtual media collections in accordance with the user profile, wherein the plurality of the different virtual media collections includes information obtained directly from at least a broadcasted television signal; and browsing the virtual library by moving between the plurality of different media collections under user control;

searching the virtual unified space with a search engine under user control; and filtering the results of the searching step in accordance with the user profile and the browsing step, wherein said filtering comprises explicit and implicit filtering, wherein said explicit filtering provides filtering of from information from said plurality of different media collections and said implicit filtering draws from collaborative data among said plurality of different media collections and similar user profiles;

prioritizing results of said filtering step; and updating the user profile in accordance with at least one selection of the results of the filtering step, wherein said updating is reflected in a ratio in responding to said user's current programming choice or specific requests.

2. The method as in claim 1 wherein the plurality of the different virtual media collections includes information obtained from a vertical blanking interval of an analog television signal.

3. The method as in claim 1 wherein the plurality of the different virtual media collections includes information received from a radio, a cable, and a satellite broadcast.

4. The method as in claim 1 wherein the user profile establishing step comprises:

presenting a variety of questions to the user about the user's interests; and creating a user profile based on the user's answers to the questions.

5. The method as in claim 1 wherein the populating step comprises:

acquiring information items from a plurality of information sources of different media type in accordance with the user profile; and placing the information items into the virtual multiple media collections based on their respective information sources.

6. The method as in claim 1 wherein the populating step comprises:
    comparing the user profile with a collective profile database to establish a similar collective profile;
    acquiring information items from a plurality of information sources of different media type in accordance with the collective profile; and
    placing the information items into the virtual multiple media collections based on their respective information sources.

7. The method as in claim 6 further comprising:
    identifying a selection of at least one of the information items by the user from one of the media collections; and
    updating the user profile in accordance with the identifying step.

8. The method as in claim 1 wherein the media collections comprises respective pluralities of similarly classifiable information items, further comprising:
    identifying a selection of at least one of the information items by the user from one of the media collections; and
    updating the user profile in accordance with the identifying step.

9. The method as in claim 1 further comprising augmenting the user profile in accordance with a collaborative data base.

10. The method as in claim 1 further comprising storing results of the searching step as media collections in the unified space for browsing by the user.

11. A receiver apparatus for obtaining content from multiple information sources for viewing by a viewer, comprising:
    an input/output ("I/O") controller including an Internet connection input, a video output, and a selector input;
    an adaptive user profile database;
    a filter coupled to the adaptive user profile database, the filter being coupled to the I/O controller for filtering information from the Internet connection input in accordance with the adaptive user profile database, wherein said filtering comprises explicit and implicit filtering, wherein said explicit filtering provides filtering of information from said plurality of different media collections and said implicit filtering draws from collaborative data among said plurality of different media collections and similar user profiles,
    an output display device configured to display a virtual unified space including a virtual library transmitted through the video output;
    a populater that populates the virtual library with virtual multiple media collections using the filtered information from the filter;
    a browser that browses the virtual library by moving between multiple media collections in accordance with the selector input; and
    a recommender that recommends virtual media in the virtual multiple media collections in the virtual library to a user based on a user profile for the user, and
    an updater for updating the user profile based on at least one selection of the recommended virtual media, wherein said updating is reflected in a ratio in responding to said user's current programming choice or specific requests.

12. The receiver apparatus as in claim 11 wherein the media collections comprises respective pluralities of similarly classifiable information items, further comprising:
    an identifier that identifies a selection of one of the information items by the user from one of the media collections; and
    an updater that updates the adaptive user profile database in accordance with the identifying step.

13. The receiver apparatus as in claim 12 wherein the virtual multiple media collections include information obtained from a broadcasted television signal and the Internet.

14. The receiver apparatus as in claim 13 wherein the I/O controller further comprising an input for receiving television programs, including additional information through the television program and an electronic program guide information, the filter being coupled to the I/O controller for filtering information from the television program input in accordance with the adaptive user profile database.

15. The receiver apparatus of claim 11, wherein the populater populates the virtual library with virtual media collections, wherein the plurality of the different virtual media collections includes information obtained directly from an analog television signal.

16. A computer program product comprising a computer readable medium having program logic recorded thereon for enabling a computer-enabled apparatus to display personalized information for a user from multiple information sources, comprising:
    a populater for populating a virtual library with a plurality of different virtual media collections in accordance with a user profile, wherein the virtual library is populated with different types of media obtained from different media sources; and
    a browser for browsing the virtual library by moving between the plurality of different media collections under user control;
    a search engine for searching the virtual library under user control; and
    a filter for filtering the results of the searching step in accordance with the user profile and said browsing step, wherein said filtering comprises explicit and implicit filtering, wherein said explicit filtering provides filtering of information from said plurality of different media collections and said implicit filtering draws from collaborative data among said plurality of different media collections and similar user profiles;
    a prioritizer for prioritizing results of the filtering step; and
    an updater for updating the user profile in accordance with at least one selection of the results of the filtering step, wherein said updating is reflected in a ratio in responding to said user's current programming choice or specific requests.

17. The computer program product as in claim 16 wherein the media collections comprises respective pluralities of similarly classifiable information items, further comprising:
    an identifier for identifying a selection of one of the information items by the user from one of the media collections; and
    an updater for updating the user profile in accordance with the identifying step.

18. The computer program product as in claim 17 wherein the different media sources include internet data and a broadcasted television signal.

* * * * *